(12) United States Patent
Oshiro

(10) Patent No.: US 6,497,908 B1
(45) Date of Patent: Dec. 24, 2002

(54) TURMERIC-CONTAINING COOKING OILS AND FATS

(76) Inventor: Seiri Oshiro, 27-21 Kyohara-cho, Naha-shi, Okinawa 901-0151 (JP)

(*) Notice: Subject to any disclaimer, the term of this patent is extended or adjusted under 35 U.S.C. 154(b) by 0 days.

(21) Appl. No.: 09/616,417

(22) Filed: Jul. 14, 2000

(30) Foreign Application Priority Data

Jul. 19, 1999 (JP) ............................................. 11-204194

(51) Int. Cl.⁷ ................................................. A23D 9/00
(52) U.S. Cl. ........................ 426/238; 426/248; 426/601; 426/650; 426/486
(58) Field of Search ................................. 426/238, 248, 426/601, 650, 486

(56) References Cited

U.S. PATENT DOCUMENTS 4,138,212 A * 2/1979 Stransky ..................... 426/250

FOREIGN PATENT DOCUMENTS

| JP | 519531 | 3/1993 |
| JP | 5316989 | 12/1993 |
| JP | 6009479 | 1/1994 |
| JP | 8214825 | 8/1996 |
| JP | 410084908 | * 4/1998 |
| JP | 4102953234 | * 11/1998 |
| JP | 411299444 | * 11/1999 |
| KR | 9640167 | 12/1996 |

OTHER PUBLICATIONS

Chiarello, M. 1995. Flavored Oils. Chronicle Books, San Francisco, CA. Table of Contents and pp. 18–24.*

Derwent Acc No. 2000–042678. Abstract of JP 11299444A.*

Derwent Acc No. 1998–264802. Abstract of JP 2873678 B2.*

Derwent Acc No. 1999–038235. Abstract of JP 2994607 B2.*

Witty, Helen. 1986. Fancy Pantry. Workman Publishing, New York, pp. 201–203.*

Lawless, Julia. 1995. The Illustrated Encyclopedia of Essential Oils. Barnes & Nobel Books. New York. p. 131.*

Hedley, Christopher. 1996. Herbal Remedies. Parragon. p. 56.*

Peterson, James. 1998. Sauces. John Wiley & Sons, Inc., New York. pp. 401–407.*

H. Ozaki; "Conquerableness of Herbal Medicine, Turmeric"; *Gendai Shorin*; Nov. 1, 1997; pp. 62–66.

Y. Niwa; "Development/Improvement of Food with DDS/SOD Operation of Natural Plant/Seed and Its Medicinal/Biochemical Study"; *The Food Industry*; Korin Publishing Company Limited; Jul. 30, 1992; pp. 46 and 48.

* cited by examiner

*Primary Examiner*—Carolyn Paden
(74) *Attorney, Agent, or Firm*—Greer, Burns & Crain, Ltd.

(57) ABSTRACT

One species or a mixture of a plurality of species of turmeric, which are made to contain a water content and dried after being irradiated with a far infra-red ray, is soaked in cooking oils and fats. A far infra-red ray is further irradiated, so that oil-soluble ingredients are dissolved. As a result, active ingredients, which are easy to be absorbed in intestines, are generated from the raw turmeric, the oil-soluble ingredients of the turmeric, such as curcumin, essential oil, etc. are dissolved in the cooking oils and fats to facilitate the absorption in intestines, and an offensive smell and a bitterness, which are peculiar to turmeric, are removed.

8 Claims, No Drawings

TURMERIC-CONTAINING COOKING OILS AND FATS

BACKGROUND OF THE INVENTION

1. Field of the Invention

The present invention relates to turmeric-containing cooking oils and fats and a manufacturing method thereof, and more particularly to turmeric-containing cooking oils and fats which are made to be easily absorbed in intestines by dissolving oil-soluble ingredients of turmeric, such as curcumin, essential oil, etc., in the cooking oils and fats, and from which an offensive smell and a bitterness, which are peculiar to the turmeric, are removed.

2. Description of the Related Art

Conventionally, a rhizome of turmeric, which is a kind of herb, is decocted in an earthenware teapot and taken as a decoction. For decoction in earthenware, generally, a couple of pinches of sliced dried turmeric are put into an appropriate quantity of water, boiled down for 30 minutes or an hour to one half of the original quantity of water, filtered, and taken.

Or, a rhizome of fresh turmeric is grated with a grater in the same way Japanese horseradish is grated, and taken with water. Additionally, some regular drinkers soak turmeric in shochu (clear liquor), awamori (Okinawan spirit), etc., and drink as turmeric liquor by choice.

Recently, raw turmeric is generally used by being dried with hot air and powdered for ease of use, marketed as powdered medicine or tablets, and taken with water.

However, the conventional turmeric usage has the following disadvantages and problems.

1. It is troublesome and time-consuming to decoct turmeric in an earthenware teapot.
2. Fresh turmeric grated by a grater has peculiar offensive smell and bitterness, and is difficult to be taken, and besides, the oil-soluble ingredients such as curcumin, essential oil, etc., are difficult to be absorbed in intestines due to the reasons to be described later.
3. Since also the peculiar offensive smell and bitterness are dissolved in turmeric liquor in addition to the oil-soluble ingredients such as the curcumin, essential oil, etc., which are absorbable in intestines, it is difficult to be consumed.
4. Turmeric processed into tablets can be taken relatively easily. However, its efficacious ingredients are difficult to be absorbed in intestines due to the reasons to be described later.
5. Powdered turmeric is difficult be taken because of the peculiar offensive smell and bitterness similar to fresh grated turmeric, and in addition, the oil-soluble efficacious ingredients are difficult to be absorbed in intestines.

Here, details of the above described disadvantages and problems are further explained. Turmeric is mainly composed of oil-soluble ingredients such as curcumin and essential oil or an essential oil ingredient, the generic name for the essential oil, and the water-soluble ingredients, typified by offensive smell and bitterness ingredients.

The oil-soluble ingredients are dissolved in ethanol and oils and fats, but not in water. In the meantime, the water-soluble ingredients such as part of the offensive smell ingredient, and the bitterness ingredient are dissolved in water, but not in oils and fats.

If turmeric in tablet form or fresh grated turmeric is taken with water, its oil-soluble ingredients remain locked in turmeric powder, and most of the ingredients are excreted outside the human body without being absorbed in intestines.

Originally, turmeric must be taken after its efficacious ingredients are generated by being decocted, and a synergistic effect is achieved by mixing the generated efficacious ingredients with curcumin and essential oil. Accordingly, for the above described powdered or tablet-form turmeric, which are obtained only by being dried and powered without being decocted, their efficacious ingredients are not generated. Therefore, the synergistic effect with curcumin and essential oil cannot be expected, and the efficacy is lower than that of turmeric decocted in an earthenware teapot.

That is, even if powdered or tablet-form turmeric, or fresh grated turmeric is taken with water, the efficacy inherent in turmeric is not great enough to maintain and promote health.

Furthermore, since the oil-soluble ingredients of turmeric are sufficiently dissolved in turmeric liquor made by soaking turmeric in shochu, awamori, etc., due to the existence of ethanol, the oil-soluble ingredients are easily absorbed in intestines if the turmeric liquor is consumed. However, because the peculiar offensive smell and bitterness ingredients are water-soluble, these ingredients are dissolved in the turmeric liquor in which ethanol and water are mixed. For this reason, the peculiar offensive smell and bitterness are imparted to the turmeric liquor, leading to difficulty in consuming the turmeric liquor.

SUMMARY OF THE INVENTION

To overcome the above described problems, according to a preferred embodiment of the present invention, the oil-soluble ingredients of turmeric, such as curcumin, essential oil, etc., are dissolved in cooking oils and fats. As a result, the oil-soluble ingredients become easier to be absorbed in intestines, and at the same time, the offensive smell land bitterness ingredients of turmeric can be removed from cooking oils and fats by soaking turmeric in the cooking oils and fats, and by selectively eluting only the oil-soluble ingredients without dissolving the offensive smell and bitterness ingredients in the cooking oils and fats.

According to another preferred embodiment of the present invention, active (efficacious?) ingredients are newly generated by irradiating turmeric with a far infra-red ray after the turmeric is soaked in water beforehand and made to have a water content. This is based on the phenomenon that active ingredients can be generated by irradiating with a far infra-red ray turmeric having a water content. Also the newly generated oil-soluble ingredients can be dissolved along with curcumin and essential oil, which are inherent in turmeric, by soaking the turmeric processed as described above in cooking oils and fats.

According to a further preferred embodiment of the present invention, by using for cooking the oils and fats in which the oil-soluble ingredients of turmeric, such as curcumin, essential oil, etc., are dissolved, and from which the offensive smell and bitterness are removed, it becomes possible to make superior turmeric product which ensures that efficacious ingredients such as curcumin, essential oil, etc., can naturally be taken on a day-to-day basis.

Here, turmeric may be one of turmeric, Haruukon (wild turmeric: botanical name is *Curcuma aromatica* Salisb), and gajyutsu (zedoary: botanical name is *Curcuma zedoaria* Roscoe), which belong to Curcuma Genus, or their mixture.

Furthermore, turmeric-containing oils and fats may further contain the oil-soluble ingredients of one or more herbal species.

DESCRIPTION OF THE PREFERRED EMBODIMENTS

Explained first is how to facilitate the absorption of oil-soluble ingredients in intestines by dissolving the oil-soluble ingredients of turmeric, such as curcumin, essential oil, etc., in cooking oils and fats, and how to remove the offensive smell and bitterness ingredients from the cooking oils and fats by selectively dissolving not the offensive smell and bitterness ingredients but only the oil-soluble ingredients with the soaking of the turmeric in the cooking oils and fats.

Provided next is the explanation about how to newly generate active ingredients by irradiating turmeric with a far infra-red ray after the turmeric is soaked in water beforehand and made to have a water content, since active ingredients can be generated by irradiating with a far infra-red ray turmeric having a water content, and how to dissolve also the oil-soluble ingredients that are newly generated along with curcumin and essential oil, which are inherent in the turmeric, by soaking the turmeric processed as described above in cooking oils and fats.

Provided further is the explanation about how to make cooking oils and fats in which the oil-soluble ingredients such as curcumin, essential oil, etc., are dissolved, and from which the offensive smell and bitterness are removed, and about (how to make?) superior turmeric products which ensure that the efficacious ingredients such as curcumin, essential oil, etc., can be easily taken on a day-to-day basis only by using the above described oils and fats for cooking with a normal method.

Although the above described curcumin and essential oil are soluble in cooking oils and fats, they cannot easily be eluted from turmeric. Examples of a method dissolving the oil-soluble ingredients of turmeric in cooking oils and fats include: a method soaking turmeric in cooking oils and fats, and heating the oils and fats to approximately 80 to 120° C. a method dissolving the oil-soluble components of turmeric in a short time by heating and pressurizing the oils and fats in which turmeric is soaked, and preventing the essential oil from volatilizing; a method leaving the cooking oils and fats in which turmeric is soaked as they are at a temperature of approximately 20 to 35° C. for several tens of days; a method eluting the ingredients of turmeric by pouring cooking oils and fats into a bag including turmeric, and by hitting the bag with a wooden stick; a method eluting the ingredients of turmeric by applying an ultra-sonic wave to the cooking oils and fats in which the turmeric is soaked; a method significantly reducing the time required to dissolve the ingredients of turmeric to one to several days by irradiating with a far infra-red ray the oils and fats in which turmeric is soaked, in comparison with the above described method leaving turmeric as it is for several tens of days; and a method obtained by combining the above described method irradiating with a far infra-red ray the oils and fats in which turmeric is soaked and the method applying an ultra-sonic wave.

The ingredients of turmeric may be dissolved with any of the above described methods. However, with the method irradiating with a far infra-red ray the cooking oils and fats in which turmeric is soaked, the ingredients can be eluted in a short time, such as one to several days, at a temperature of approximately 35 to 70° C., thereby preventing the volatilization and the decomposition of the efficacy or active ingredients of turmeric, and obtaining a desirable product. A longer irradiation time is more advantageous to sufficiently dissolve the ingredients. However, one to several days or so are desirable from a cost-effective viewpoint.

Furthermore, the oil-soluble ingredients are extracted and separated from turmeric beforehand with a processing method except for the one dissolving the ingredients of turmeric in cooking oils and fats, as a method extracting the oil-soluble ingredients, and the separated oil-soluble ingredients. are added to the cooking oils and fats, so that turmeric-containing cooking oils and fats can be obtained.

The technique extracting and separating curcumin from turmeric without the offensive smell and bitterness ingredients is disclosed by the Japanese Laid-open Patent Publication No. 6-9479.

The oil-soluble ingredients that are extracted and separated from turmeric with the above described technique or the like, can be dissolved in cooking oils and fats at a relatively high concentration.

The turmeric-containing cooking oils and fats in which the oil-soluble ingredients are dissolved at a high concentration can be used not only as oils and fats for cooking by being appropriately diluted, but also as capsules into which the oils and fats are formed.

Turmeric that is soaked in cooking oils and fats becomes easier to dissolve by being crushed in fragments after sufficiently dried as a preprocess. This is because its surface area is expanded.

Examples of the cooking oils and fats used in the present invention include vegetable oils such as olive oil, sesame oil, peanut oil, rape oil, corn oil, soybean oil, etc., or animal oils such as lard, beef fat, fish fat, etc.

These oils and fats may be available alone or their mixture, and also available depending on a cooking material to be used or cook's liking. The vegetable oils such as olive oil, sesame oil, soybean oil, etc., which are considered to be good for maintaining and promoting health, are desirable.

To generate active ingredients that are equivalent to or higher than those obtained by decocting turmeric in an earthenware teapot, raw turmeric is soaked in water to make it contain some water, irradiated with a far infra-red ray, and dried, so that the dried turmeric which sufficiently contains the active ingredients can easily be obtained.

The turmeric used in the present invention are species of the Curcuma Genus belonging to Zingiberaceae Family. Approximately 50 species have been found. The turmeric, which prefers a hot and humid climate, grows wild or is cultivated and is widely distributed from tropical to subtropical zones ion the continents of Asia, Africa, India, and Latin America. In Japan, Okinawa and Kagoshima prefectures are major turmeric-producing regions.

Especially familiar species among the species, which are generically called turmeric and cultivated in Japan, are turmeric (botanical name is *Curcuma longa*), Kyouo (wild turmeric: botanical name is *Curcuma aromatics* Salisb), and Gajyutu (zedoary: botanical name is *Curcuma zedoaria* Roscoe).

According to the known documents, powder of a turmeric rhizome is widely used for curried food, a coloring agent of takuan (yellow pickled radish), cosmetics, medicines, health food, etc. Especially, turmeric is considered to have efficacy on life-style related diseases such as liver disease, diabetes, hypertension, etc., and studies are currently under way in Japan and the U.S.

The following document discloses the ingredients and the efficacy of turmeric.

"Conquerableness of a Wild Herbal Turmeric" written by H. Ozaki, and published by Gendai Shorin Turmeric (*Curucuma longa*), which is hereinafter referred to as a popular name Akiukon to avoid confusion, contains approximately 3.6 percent of curcumin and 1 to 6 percent of essential oil.

Kyouo (hereinafter referred to as Haruukon) contains approximately 0.3 percent of curcumin and approximately 6 percent of essential oil.

Gajyutu (hereinafter referred to as Murasakiukon) contains 0 percent of curcumin and 1 to 1.5 percent of essential oil.

Furthermore, a species of turmeric, which grows wild in Myanmar, is reported to contain approximately 9.7 percent of curcumin and approximately 7.22 percent of essential oil.

As described above, there are considerable differences from an ingredient viewpoint even in the same Curcuma Genus.

Turmeric contains a variety of ingredients having different natures, typified by curcumin and essential oil. According to a certain study, as many as 4,000 to 5,000 ingredients were reported to be contained.

It is known that both curcumin and essential oil have effects on health promotion. Since the ingredients contained in Akiukon, Haruukon, Murasakiukon, etc. have efficacy that are different from one another, it is medically reported that the interaction of contained ingredients results in high efficacy if predetermined amounts of the different turmeric species are mixed and used.

A desirable method is implemented by soaking each of the turmeric species alone in cooking oils and fats, by producing turmeric-containing cooking oils and fats, which only contain each of the turmeric species, and by making final products by mixing predetermined amounts of the obtained products, in addition to a method soaking in cooking oils and fats several turmeric species such as Akiukon, Haruukon, Murasakiukon, etc., which are mixed beforehand, to make cooking oils and fats contain the oil-soluble ingredients of several turmeric species.

This method is similarly applied to the case where herbs, herbal medicines, etc. are mixed with turmeric.

Additionally, for example, herbal medicines such as ginseng (botanical name is *Panax ginseng*), Densiti (botanical name: *Panax notoginseng* F. H. Chen), etc. are mixed with turmeric and the oil-soluble ingredients are dissolved, whereby higher efficacy can be obtained with the synergistic effect of the efficacy of the mixed herbal medicines along with that of turmeric.

Furthermore, according to the technique disclosed by Japanese Laid-open Patent Publication No. 8-214825, bitterness can be removed from turmeric by lactobacillus-fermenting the turmeric.

With this method, turmeric from which bitterness is removed is generated by adding rice or wheat bran and saccharide to a turmeric rhizome, which is dried and crushed, by fermenting the rhizome after being added the rhizome lactobacillus as a culture medium, and by heating and drying the fermented rhizome.

Thus fermented turmeric is popularly called fermented turmeric, and packed as tea bags on which hot water is poured, and drunk as tea by choice.

However, as described in detail in the specification of the present invention, the oil-soluble ingredients such as curcumin, essential oil, etc. are never dissolved in cold or hot water even if the fermentation process is performed. Only the water-soluble components are dissolved in cold or hot water.

Therefore, most of the curcumin and essential oil of fermented turmeric are excreted outside the human body, and absorbed in intestines in few cases.

If fermented turmeric is processed according to the present invention, also the oil-soluble ingredients, which have efficacious components and are newly generated with the fermentation process, are dissolved in cooking oils and fats as well as curcumin and essential oil, thereby obtaining turmeric-containing cooking oils and fats with high efficacy.

Herbs recited in the embodiments according to the present invention indicate herbs or herbal medicines including oil-soluble ingredients, which are not limited to the following herbs and foods, as well as Chinese herbal medicines such as ginseng, Gokahi (botanical name is *Acanthopanax sieboldianus* Makino), Tsurudokudami (botanical name is *Polygonum multiflorum* Thunb), Nezumimoti (botanical name is *Ligustrum japonicum* Thunb), Gomisi (botanical name is *Schisandra chinensis* Baill), Totyu (gutta-perca tree: botanical name is *Eucommia ulmoides* Oliv), Taiso (common jujube: botanical name is *Zizyphus jujuba* Mill), Tenma (botanical name is *Gastrodia elata* Blume), Shoga (ginger: botanical name is *Zingiber officinalis*), Densiti (botanical name is *Panax notoginseng* F. H. Chen), etc., or health food such as Chinese matrimony vine, shiitake mushroom, agaricus mushroom, propolis, etc.

The reason why efficacious ingredients are generated by irradiating turmeric with a far infra-red ray is the same as that of the turmeric decoction in an earthenware teapot. Generally, decoction is to decoct an appropriate quantity of water that is poured into an earthenware teapot including a herb or a herbal medicine, and to boil down for approximately 30 to 60 minutes to one half of the original quantity of water.

At this time, a far infra-red ray is emitted from the heated earthenware teapot. It is known that, especially, by making a far infra-red ray with approximately 4- to 14-micron wavelength singularly act upon the organic macromolecular substance within a herbal medicine or a herb, part of the organic macromolecular substance is decomposed into molecules with a weight equal to or lower than 5,000, which are absorbable in intestines, an anti-oxidant substance is newly generated with the decomposition of the macromolecular substance into molecules with a low weight, and efficacious ingredients are activated.

The following document discloses that, by irradiating the macromolecular substance with a far infra-red ray, a macromolecular substance is decomposed into molecules with a low weight, and efficacious ingredients are activated.

"The Food Industry, Vol. 35, 1992, pages 42–54"

Written by Y. Niwa, and published by Korin Publishing Co., Ltd. Japanese Laid-open Patent Publication No. 05-19531.

Additionally, page 49 of Vol. 35 of "The Food Industry" states that efficacy is significantly improved by roasting a fresh Chinese herbal medicine having a water content, in relation to the point that active ingredients, which are absorbable in intestines, are generated, and efficacy is further increased by irradiating a herb or a herbal medicine having a water content with a far infra-red ray.

Namely, roasting is to roast cereals by emitting a far infra-red ray from an earthenware pot that is heated to approximately 100 to 200° C. The above described roasting of a fresh herbal medicine is to irradiate a herbal medicine having a water content with a far infra-red ray. This is the same principle as that of decocting. The technique for generating an anti-oxidant substance from a herb by irradiating the herb having a water content with a far infra-red ray with the use of the above described principle is disclosed by Japanese Patent Application No. 10-314229 that the present applicant filed on Nov. 5, 1998.

The amount of dried turmeric, which is soaked in cooking oils and fats, is determined according to each efficacious ingredient content of the turmeric and a dissolution concentration to be targeted. Generally, dried turmeric is approximately 20 to 200 grams against cooking oils and fats of 1,000 milliliters. However, approximately 5 to 30 grams is desirable if oils and fats are used for cooking unchanged.

Additionally, it does not matter at all if turmeric-containing cooking oils and fats in which the ingredients of turmeric are dissolved at high concentration are diluted to a predetermined concentration and used according to a dish to be cooked.

Furthermore, a preferably flavored product can be obtained by soaking a cooking herb, etc. along with turmeric in order to add a flavor to turmeric-containing cooking oils and fats. Soaking of a herb, etc. has no influence on the dissolution of oil-soluble ingredients of turmeric.

The technique for soaking spices and/or herbal vegetables in cooking oils and fats, and for eluting spicy or flavor ingredients by irradiating with a far infra-red ray is disclosed by Japanese Laid-open Patent Publication No. 5-316989. The invention disclosed by this document is a technique for manufacturing flavored oil for a short time (4 to 24 hours) by irradiating cooking oils and fats with a far infra-red ray and making them mature after spices and/or herbal vegetables, for which no physical, chemical, and microorganic processes are performed, are soaked in the cooking oils and fats.

However, the present invention realizes the generation and the dissolution of additional active ingredients besides the natural ingredients inherent in turmeric. Namely, active ingredients are dissolved along with the oil-soluble ingredients of turmeric by soaking turmeric in cooking oils and fats after the active ingredients such as an anti-oxidant substance, etc., which are absorbable in intestines, are generated from the turmeric that is irradiated with a far infra-red ray beforehand.

Furthermore, the present invention was developed by a discovery such that the offensive smell and bitterness ingredients of turmeric are water-soluble, and the offensive smell and bitterness ingredients can be removed from cooking oils and fats by selectively dissolving only the oil-soluble ingredients at the stage where the oil-soluble ingredients are dissolved in the cooking oils and fats. An object, method, and products of the present invention are completely different from those of the technique disclosed by the above described Japanese Laid-open Patent Publication No. 5-316989.

Dregs, which are left after the oil-soluble ingredients of turmeric are dissolved according to the present invention, contain many water-soluble ingredient types. Also these water-soluble ingredients are considered to be ingredients efficacious for gastrointestinal diseases. Therefore, the water-soluble ingredients are separated from the dregs with steam distillation, and can be used as a new medicine.

EXAMPLE 1

Approximately 100 grams of sliced and dried Akiukon, which is soaked in water for approximately 20 minutes, is irradiated with a far infra-red ray from a far infra-red ray heater (ceramic heater) 50 centimeters apart, and dried with hot air. Then, Haruukon, Murasakiukon, and Myanmar-grown turmeric are processed and dried in a similar manner, and dried Haruukon, Murasakiukon, and Myanmar-grown turmeric are respectively obtained.

After 30 grams of Akiukon, 30 grams of Haruukon, 30 grams of Murasakiukon, and 30 grams of Myanmar-grown turmeric, which are obtained as described above and crushed in fragments by a crusher, are mixed, 120 grams of the mixed turmeric is soaked in olive oil of 1,000 milliliters contained in a stainless vessel. Then, the oil-soluble ingredients of the turmeric are dissolved by irradiating with a far infra-red ray for approximately 48 hours from the far infra-red ray heater 50 centimeters apart. Next, transparent turmeric-containing olive oil is obtained by filtering the olive oil in which the minute particles of the turmeric are muddled. Air is sent to prevent the temperature of the olive oil, which is irradiated with a far infra-red ray, from rising too high, and to adjust the temperature to approximately 70° C. The olive oil is stirred during that time period.

EXAMPLE 2

After respective 30-gram powders of Akiukon, Haruukon, Murasakiukon, and Myanmar-grown turmeric, which are obtained with the same method as that in Example 1, are mixed, the mixed turmeric of 120 grams is soaked in olive oil of 1,000 milliliters within a stainless vessel. Transparent turmeric-containing olive oil is obtained by filtering the olive oil after the stainless vessel is left alone for approximately 45 days in a room at a temperature of 25 to 32° C. The oil is stirred during that time period.

EXAMPLE 3

Fermented turmeric of 120 grams is soaked in olive oil of 1,000 milliliters within a stainless vessel with the method disclosed by Japanese Laid-open Patent Publication No. 8-214825. Then, the oil-soluble ingredients of the turmeric are dissolved in the olive oil by irradiating with a far infra-red ray from the far infra-red ray heater 50 centimeters apart for approximately 48 hours, with the same method as that in Example 1. Next, transparent turmeric-containing olive oil is obtained by filtering the oil in which the minute particles of the turmeric are muddled. Air is sent to prevent the temperature of the olive oil, which is irradiated with the far infra-red ray, from rising too high, and to adjust the temperature to approximately 70° C. The oil is stirred during that time period.

EXAMPLE 4

Experiments on manufacturing of turmeric-containing cooking oils and fats are conducted by replacing the olive oils used in Examples 1 through 3 respectively with sesame oil, soybean oil, corn oil, and rape oil. Their results are the same as those obtained in Examples 1 through 3.

The turmeric-containing olive oils obtained in Example 1 through 3 contain sufficiently dissolved curcumin and essential oil, and have a yellowish green color peculiar to curcumin, some viscosity, and a slight flavor peculiar to turmeric. However, these oils have no peculiarly offensive smell and bitterness like fresh grated turmeric or turmeric liquor.

The obtained turmeric-containing olive oil were used for cooking. These oils were available for chow mein, vegetable saute, grilled meat, soup, etc., or as a salad dressing, similar to normal olive oil. The cooked dishes were colored slightly in yellowish green and arouses the appetite. At the same time, it was realized that the efficacious ingredients can sufficiently be consumed. The cooked dishes have no peculiar offensive smell and bitterness.

What is claimed is:
1. Turmeric-containing cooking oils or fats containing oil-soluble ingredients of turmeric, which are eluted from a rhizome of the turmeric and low molecular substances generated by decomposing macromolecular substances in the turmeric.

2. The turmeric-containing cooking oils or fats according to claim 1,
wherein offensive smell and bitterness ingredients of the turmeric are removed from the oil-soluble ingredients of the turmeric.

3. The tunneric-containing cooking oils or fats according to claim 1,
wherein the turmeric is a mixture of one or a plurality of turmeric, wild turmeric, and zedoary, which belong to Curcuma Genus.

4. A method manufacturing turmeric-containing cooking oils or fats, comprising:
irradiating turmeric which contains water with a far infra-red ray; and
selectively dissolving oil-soluble ingredients existing in turmeric in cooking oils or fats by soaking the turmeric in the cooking oils or fats.

5. The method according to claim 4, further comprising:
irradiating with a far infra-red ray the turmeric soaked in cooking oils or fats for selectively dissolving the oil-soluble ingredients in the cooking oils or fats.

6. The method according to claim 4, wherein the turmeric is dried powder of a rhizome of the turmeric.

7. The method according to claim 4, wherein
the turmeric is fermented turmeric obtained by performing a fermentation process for a rhizome of the turmeric.

8. A method manufacturing turmeric-containing cooking oils or fats, comprising:
selectively dissolving oil-soluble ingredients existing within turmeric in cooking oils and fats by soaking the turmeric in the cooking oils and fats; and
eluting oil-soluble ingredients from turmeric by applying an ultra-sonic wave to the turmeric soaked in cooking oils or fats.

* * * * *

UNITED STATES PATENT AND TRADEMARK OFFICE
CERTIFICATE OF CORRECTION

PATENT NO.    : 6,497,908 B1
DATED         : December 24, 2002
INVENTOR(S)   : Seiri Oshiro It is certified that error appears in the above-identified patent and that said Letters Patent is hereby corrected as shown below:

<u>Title page,</u>
Item [56], FOREIGN PATENT DOCUMENTS, delete "JP 4102953234," and insert -- JP 410295324 -- therefor.

<u>Column 2,</u>
Line 31, delete "land" and insert -- and -- therefor.

Signed and Sealed this

Sixteenth Day of September, 2003

JAMES E. ROGAN
*Director of the United States Patent and Trademark Office*